United States Patent [19]
Boyer et al.

[11] Patent Number: 5,581,550
[45] Date of Patent: Dec. 3, 1996

[54] PROCEDURE FOR TIME SPACING OF TRANSMITTALS FROM CELLS RELATING TO MESSAGES, AS WELL AS DEVICES FOR THE IMPLEMENTATION OF SUCH A PROCEDURE

[75] Inventors: Pierre Boyer; Jacqueline Boyer; Michel Servel, all of Lannion, France

[73] Assignee: France Telecom, Paris, France

[21] Appl. No.: 264,009

[22] Filed: Jun. 22, 1994

[30] Foreign Application Priority Data

Jun. 24, 1993 [FR] France .................. 93 07942

[51] Int. Cl.⁶ .................................. H04L 12/56
[52] U.S. Cl. .................. 370/395; 370/253; 370/465
[58] Field of Search ................... 370/13, 17, 60, 370/60.1, 94.1, 94.2, 84, 82, 79

[56] References Cited

U.S. PATENT DOCUMENTS

| | | | |
|---|---|---|---|
| 5,278,825 | 1/1994 | Wallmeier et al. | 370/61 |
| 5,390,176 | 2/1995 | Schoute et al. | 370/60.1 |
| 5,400,336 | 3/1995 | Boyer et al. | 370/60.1 |

FOREIGN PATENT DOCUMENTS

| | | |
|---|---|---|
| 0422549 | 4/1991 | European Pat. Off. . |
| 0438009 | 7/1991 | European Pat. Off. . |
| 0498092 | 8/1992 | European Pat. Off. . |
| 0504082 | 9/1992 | European Pat. Off. . |

Primary Examiner—Wellington Chin
Assistant Examiner—Melissa Kay Carman
Attorney, Agent, or Firm—Laff, Whitesel, Conte & Saret, Ltd.

[57] ABSTRACT

A process is described for spacing over time the transmissions of cells that belong to messages. The value of the address of the first cell of the message is stored in relation to the clock-time of the sending. At each time given by a local clock-time, the address value is read in relation to said local time. The cell having said address is sent. Then, the sending clock-time of the next cell of said message is computed. The address of the next cell of the message is determined. The address value of the next cell is stored in relation to the clock-time of its computed transmission. The invention also relates to spacing devices which are used to execute this process.

8 Claims, 3 Drawing Sheets

PROCEDURE FOR TIME SPACING OF TRANSMITTALS FROM CELLS RELATING TO MESSAGES, AS WELL AS DEVICES FOR THE IMPLEMENTATION OF SUCH A PROCEDURE

The present invention relates to a process for spacing over time, with a given period, the sending of cells that belong to messages, as well as devices for the execution of such a process.

BACKGROUND OF THE INVENTION

The purpose of the invention is to propose a device that integrates with a system that transforms a message into a plurality of cells, also called a 'celluliser', and that makes it possible to space the transmissions of cells from one another over time, by a predetermined duration.

A plurality of messages is stored in a memory called message memory, and each one of them is provided so as to be sent at a preset time and in a pre-set direction. With each message there is associated a virtual communication circuit to which a virtual circuit number is ascribed, and hereafter indicated as VCI and, to each virtual circuit there corresponds a delivery of cells that is negotiated by a protocol, of the type named FRP in the field of technique.

The problem that arises is to supply a periodic time reference for the sending of the cells belonging to a same message. As the rate of flow ascribed to each virtual circuit precisely depends on this virtual circuit and consequently on its VCI number, as well as on the FRP negotiation, the periods associated with each message will be different. It is therefore necessary periodically to awaken the sending of the cells of a given message while keeping track of the entire group of messages.

The purpose of the present invention therefore is to propose a spacing device that makes it possible to solve this problem and that, to that end, is responsible for supplying the awakening clock-times to a managing unit the main function of which is to govern the sending of a given cell pertaining to a given message, at a time set by the spacing device.

There are already known devices that are based on the use of a plurality of counters independent from one another, one counter being ascribed to a given message. The overflow of a counter governs the sending of a cell of the corresponding message. These devices may become costly when the number of messages to be treated is high. Moreover, they require solving the problem of conflicts that may arise when several countersoverflow within the same time interval.

There are also known devices that make use of counters, as do the preceding ones, but the latter are executed by means of a memory provided to store counting values associated with messages, and of adders provided to update, at each sending of a cell of a given message, the counting value associated with that message. There also, however, a high number of messages implies the use of a memory with a high number of storing blocks, and difficulty in incrementing all of the blocks at the appropriate time. Moreover, the overflow of each counting value is difficult to check.

The present invention therefore is proposing a process to space cells over time, that makes it possible to solve the different problems indicated heretofore.

BRIEF DESCRIPTION

To that end, the process according to the invention is remarkable in that it consists:

during the initialization phase of the sending of a message, in storing into a block of an address memory the value of the address, in said message memory, of the first cell of said message in relation to its time of transmission, then at each time given by a local clock,
- in reading the address value that is contained in the address memory block, and that is in relation with said local clock,
- in ordering the sending of the cell having said local address,
- in computing, by addition on the one part, of the period ascribed for the message to which said cell belongs and on the other part of the sending clock time of that cell, the clock-time for the sending of the next cell of that message,
- in determining the address of the next cell of said message by incrementation of the address of the present cell, and
- in storing the address value of the next cell thus determined into a block of the address memory in relation with the clock-time just computed for its transmission.

According to another characteristic of the present invention, the relating of an address value to a clock time is performed by the addressing of a block of the address memory with a signal representative of that clock time, the content of that block being said address value.

According to another characteristic of the invention, the storing into said address memory is done into a block the address of which is the first non-occupied address, starting from the address that corresponds to the clock time for the sending of the cell under consideration.

The present invention also relates to a device to space over time and with a given period, the sending of cells that are parts of messages, these messages being stored in a message memory in a manner such that their cells will be stored at consecutive addresses of said message memory, a period being ascribed to each message, said device being meant for the execution of the above process.

In a first mode of execution, it comprises:

- an address memory into the blocks of which there are stored the values of the addresses to the cells to be transmitted, at addresses that respectively correspond to the clock-times for the transmission of the corresponding cells.
- a time base capable of addressing the above-mentioned address memory in reading mode, with an address signal that corresponds to a local clock-time, said address memory then delivering the value of an address of the message memory.
- a managing unit provided to receive the above-read address and to order, at the same time, the sending of the cell stored at said address of the message memory,
- a translating memory in each block in which there are stored, on the one part, the period ascribed to a given virtual circuit number and, on the other part, the clock-time for sending the next cell to be sent, of the message carried by the above mentioned virtual circuit, said managing unit addressing said translating memory in the reading mode with the number of the virtual circuit to which the cell that has just be sent belongs, and the above-mentioned translation memory delivering said period and said corresponding sending clock-time.
- an adder that adds said period and said sending clock-time delivered by the translating memory and that computes the sending clock-time of the next cell to be sent, said adder being provided so as to address said address memory in the writing mode, with said computed sending clock-time, for the purpose of writing into said address memory the address value thus determined.

According to another characteristic of the invention, same comprises, in addition, means provided to permit the writing of that address value of the next cell into a block of the address memory, at the first non-occupied address starting from the address that corresponds to the sending clock-time determined by the above mentioned adder According to another mode of execution, it comprises:

an associative memory having a plurality of memorizing blocks, each one of which is divided into a first field meant to contain the value of an address, in said message memory, for a cell belonging to a message to be sent; into a second field meant to contain the clock-time for the sending of the next cell of that message; into a third field that contains a binary occupancy element;, and into a fourth field containing a binary comparison element the state of which is representative of the result of the comparison between the value contained in the second field and the value that is present on a so-called search input of said memory.

a time base provided so as to deliver to the above search input of the above-mentioned memory, a signal of local clock-time, that memory now positioned in reading mode delivering the address value contained in the first field of the block the address of which is the first address starting from a pre-set address, and the binary comparison element of which is marking an equality between the above-mentioned local clock-time present on its search input and the content of its second field.

a managing unit provided so as to receive the above-read address value and to simultaneously order the sending of the cell stored at that address of the message memory.

a translating memory in each block of which there are stored, on the one part, the period ascribed to a given virtual circuit number and, on the other part, the clock-time for the sending of the next cell that is to be sent, of the message carried by this virtual circuit, the address of each block corresponding to the above-mentioned virtual circuit number, the above managing unit addressing the translation memory in reading mode with the number of the virtual circuit to which belongs the cell that has just been sent, and the above-mentioned translation memory delivering the indicated period and the corresponding sending clock-time.

an adder that adds said period and said sending clock-time, that computes the clock-time for the sending of the next cell and that delivers it to the address memory for its writing into the second field of a block, the managing unit determining the address value of the next cell to be sent and delivering it to the address memory into a first field of the above-mentioned block, that block being the block the address of which is the first one, starting from a pre-set address and the occupation binary element of which presents a state showing availability.

According to another characteristic of the invention, same further comprises a summation circuit to deliver a signal that is representative of the number of comparison binary elements marking an equality between the second field of the blocks in said memory and the value present on the search input of that memory, a file of the first in-first out type in which there are stored, during a first duration when reading of said memory is ordered, on the one part the clock-time for sending delivered by the memory and, on the other part, the number delivered by said summation circuit, the local clock-time signal being present at the search input of said memory during the that first duration, a register loaded with the value delivered by the above file when the latter is in the reading mode, a counting-down unit that is initialized with the value of the number delivered by the file when same is in the reasing mode, and that is decremented by one unit at each reading of the register, the file beingin the reading mode when the counting-down unit reaches a count null, the register being read to deliver the clock-time signal to the search input of said memory during a second durtion of the order for the reading of said memory.

BRIEF DESCRIPTION OF DRAWINGS

The above-mentioned characteristics of the invention, as well as others, will appear more clearly upon reading of the following description of one example of execution, said description being given in relation to the attached drawing in which.

DETAILED DESCRIPTION

Figure 1:
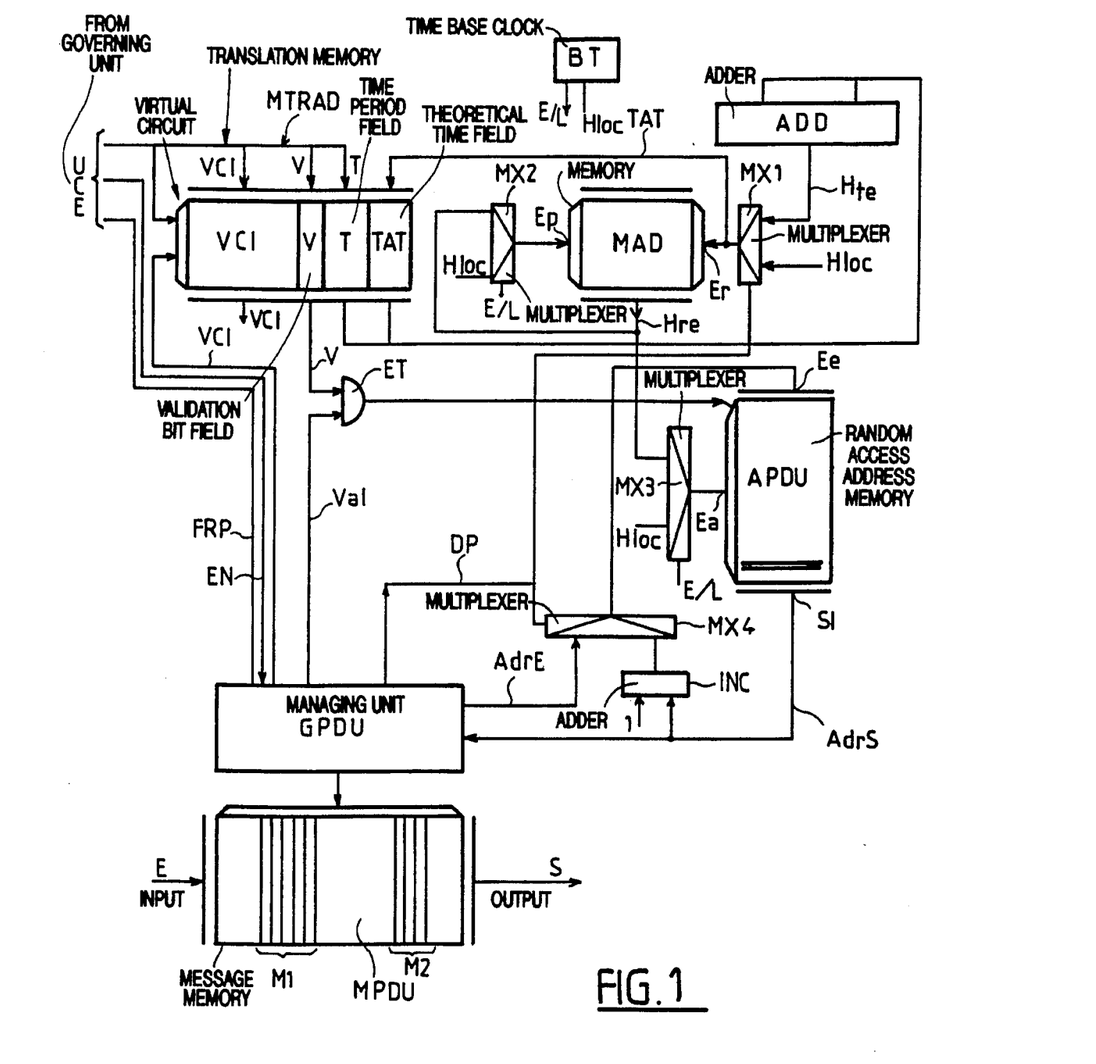
FIG. 1 is a synoptic diagram of a first mode of execution of a device provided so that it can execute the process of the invention, as indicated above.

The spacing device shown in FIG. 1 comprises a message memory MPDU in which messages are stored, for example M1, M2. Each message is divided into several cells each one of which occupies a block of the memory MPDU. The blocks of a same message are consecutive. The MPDU memory comprises an input E for the storing of the messages and an output S from which the stored cells of the messages are sent.

As already indicated in the preamble of the present specification, the invention consists in providing for means that make possible the sending of the cells with a specific rate of flow that is dependent on the number of the virtual circuit VCI to which they belong.

To that end, the memory MPDU is connected to a managing unit GPDU the main function of which is to supply said memory MPDU with the address of a block to be read in order to deliver its content onto the output S of memory MPDU.

The spacing device shown in FIG. 1 comprises a translation memory MTRAD that has as many blocks of memorization as the number of VCI numbers the device is capable of treating. Each block can be subdivided into at least three fields: a first field T that contains a value representative of the period T between the transmissions of two consecutive cells of a same message associated with the corresponding virtual circuit, a second field that contains a value representative of the theoretical clock-time TAT for the sending of the next cell forming a message associated with the corresponding virtual circuit, and a third field that contains a validation bit V the function of which will be explained below.

A VCI field may also be provided to memorize the VCI number associated with a (given) block of the MTRAD memory.

The MTRAD memory is provided to receive on its writing inputs, from a governing unit UCE that is external to the device of the invention, data that are representative, respectively, of the VCI number, of the period T, and of the sending validation bit V. It also receives, on its addressing input, the VCI number, this for the purpose of storing the data on its writing inputs at the address of the MTRAD memory designated by the VCI number.

The managing unit GPDU is connected to the addressing input of the MTRAD memory in order to deliver there a VCI number. The MTRAD memory then delivers on its reading outputs the values VCI, T, TAT and V that correspond to the number of virtual circuit VCI of the block thus addressed.

The outputs that deliver the T and TAT values respectively are connected to the inputs of an adder ADD the output of which is connected to a first input of a multiplexing unit MX1 to deliver the signal Hte at the theoretical sending clock-time. The second input of the multiplexing unit MX1 is connected to the output of a time base BT to receive on it a signal Hloc of local clock-time. The output of multiplexing unit MX1 is connected to a writing input of the memory MTRAD for a writing into the field that contains the TAT value. That output of the multiplexing unit MX1 also is connected to a search input Er of a memory MAD that searches for an available address.

The multiplexing unit MX1 is governed by a signal DP generated by the managing unit GPDU.

The MAD memory is a live memory with random access, each block of which has a capacity of one bit and it provided so as to mark a state either of availability of occupancy. The bit of each block of the MAD memory may be positioned by command of a positioning input Ep of that memory. The MAD memory is provided so as to explore, one by one, its own blocks and this starting from the address that is present on its search input ER, and so as to deliver, on its output, the address of the first block, starting from the address present on its search input ER, the bit of which marks a state of availability.

Such a memory is described, for example, in French Patent No. 87 09068.

The MAD memory has its reading output connected to an input of a multiplexing unit MX2 the other input of which receives the signal Hloc of local clock-time. Multiplexing unit MX2 has a governing input that receives a signal E/L generated by the time base BT.

The signal E/L comprises two states: a first state, called writing state, and a second state called reading state. These two states alternate with a periodicity that corresponds to the time unit of signal Hloc of the time base BT.

The MAd memory, on it search input Er, receives the signal TAT and it delivers, on its reading output, a signal Hre called real sending clock-time. Signal Hre is present on the input of the multiplexing unit MX2 and also, signal E/L being in its writing state, on the positioning input Ep of the MAD memory, this positioning the bit of the address block Hre so that it will mark a state of occupancy. When signal E/L is in its reading state, the multiplexing unit MX2 delivers the signal Hloc to the MAD memory and the latter positions the bit of the address block Hloc so that it will mark a state of availability.

The output of the MAD memory also is connected to a first input of a multiplexing unit MX3 a second input of which receives the local clock-time signal Hloc. The output of multiplexing unit MX3 is connected to the addressing input Ea of a memory APDU of the live memory with random access type that comprises as many memorization blocks as the MAD memory. Thus, each block of the MAD memory is in a one-to-one relationship with one block of the APDU memory. The multiplexing unit MX3 is governed by the signal E/L produced by the time base BT.

The APDU memory is provided so as to deliver on its reading output S1, to the managing unit GPDU, the address AdrS that is then delivered to the memory MPDU for the sending of the cell designated by that address.

The writing input Ee of the APDU memory is connected to the output of a multiplexing unit MX4 a first input of which is connected to an output AdrE of the managing unit GPDU and the other input of which is connected to the output of an adder INC provided to add the value one to the signal AdrS present on its input. The multiplexing unit MX4 is governed by the signal DP generated by the managing unit GPDU.

A gate ET receives, on a first input, the signal V generated by the memory Mtrad and, on a second input, the signal Val generated by the managing unit GPDU. The output of gate ET is connected to a validation input of memory APDU to authorize or not its functioning in reading mode.

The managing unit GPDU is provided, on the one part, to deliver to the external unit UCE a signal FRP requesting the reservation of resources and, on the other part, to receive from the unit UCE a signal En of acknowledgement of reservation of resources.

The functioning of the device according to the invention is as follows.

When a message is to be sent from memory MPDU, the managing unit GPDU sends a reservation request signal FRP to the external unit UCE and the latter replies to it by transmitting, on the one part, a signal EN of acknowledgement of resource reservation and, on the other part, the following data relative to this message to be send: the VCI number ascribed to this message, the value of the period T that corresponds to the rate of flow of the cells that form this message, as well as the validation signal V that is positioned at a level equal to one. The entire group of these data is simultaneously stored in the MTRAD memory, at the address that corresponds to the VCI number of the message.

After having received the acknowledgement signal EN, the managing unit GPDU delivers into the memory MPDU the addres AdrE of the first cell of the message being processed. It also positions the governing bit DP in a manner such that the multiplexing unit MX1 delivers the signal Hloc to the input Er of the MAD memory and to the input TAT of the MTRAD memory, and such that the multiplexing unit MX4 delivers the address signal AdrE to the writing input Ee of the APDU memory.

Thus, the value of the TAT signal takes on the value Hloc and it is stored into the memory MTRAD at the address that corresponds to the VCI number under consideration. The MAD memory supplies the real clock-time Hre that corresponds to the first non-occupied address of the MAD memory, starting from the address that corresponds to the local clock-time Hloc.

These operations take place while the signal E/L is positioned in the writing mode, that is to say in a manner such that the multiplexing unit MX2 will deliver the signal Hre to the input Ep of the MAD memory and such that the multiplexing unit MX3 will deliver this same signal Hre to the addressing input Ea of the memory APDU. Thus, the MAD memory block the address of which corresponds to Hre is positioned to mark its occupancy and the address AdrE is stored into the APDU memory at the address that corresponds to the real sending clock-time Hre.

The process for sending the cells of the message has now been initialized.

The transmissions per se of the cells of the messages are carried out according to cycles that are timed by the signal E/L delivered by the time base BT. For these cycles, the signal DP is positioned in a manner such that the multiplexing unit MX1 delivers the theoretical clock-time signal Hte to the input of the MTRAD memory and to the input Er of the MAD memory, and in a manner such that the multiplexing unit MX4 will deliver to the input Ec of the APDU memory the address signal generated by the adder INC.

When the signal E/L is in reading mode, the multiplexing unit MX2 delivers the local clock-time signal Hloc to the input of the MAD memory and the multiplexing unit MX3 also delivers the signal Hloc to the APDU memory.

The APDU memory then delivers the address signal AdrS that is stored at address Hloc. The Address AdrS corresponds to the address of the memory MPDU of the cell to be sent at the point in time that corresponds to the clock-time given by the signal Hloc. Upon reception of this address signal AdrS, the managing unit GPDU gives an order to memory MPDU for same to send the cell having address AdrS to its output S. The managing unit GPDU positions the VCI number that corresponds to the cell under consideration at the input of the MTRAD memory. The latter therefore delivers the value of the period T and the value of the period TAT, that corresponds to the real clock-time for the sending of the current cell, to the adder ADD that then computes the theoretical sending clock-time Hte of the next cell that belongs to the same virtual circuit numbered VCI.

It will be noted that the block of the MAD memory the address of which is Hre, is positioned to mark its availability.

The signal E/L passes to the writing mode.

The signal Hte computed by the adder ADD is then stored in the field TAT of the memory MTRAD and it is delivered to the input Er of the memory MAD. Memory MAD then delivers the first non-occupied address starting from the address that corresponds to the theoretical sending clock-time Hte. This address represents the real sending clock-time Hre of the next cell of the current message.

The multiplexing unit MX2 delivers the signal Hre to the memory MAD and the multiplexing unit MX3 also delivers the signal Hre to the APDU memory.

The Address block of the memory MAD that corresponds to the value of the Hre signal is positioned in order to mark a state of occupancy.

As for the multiplexing unit MX4, it delivers the address signal AdrS+1, computed by the adder INC, to the writing input Ee of the APDU memory. This address signal is then stored into the APDU memory at the address that corresponds to the real clock-time of sending, Hre.

The reading/writing cycles, timed by the E/L signal delivered by the time base BT continue until the last cell of the message has been sent. The managing unit GPDU then inhibits the process by positioning the bit V of memory MTRAD at zero. The gate ET then has its output positioned at zero, this inhibiting the functioning of the APDU memory.

Figure 2:
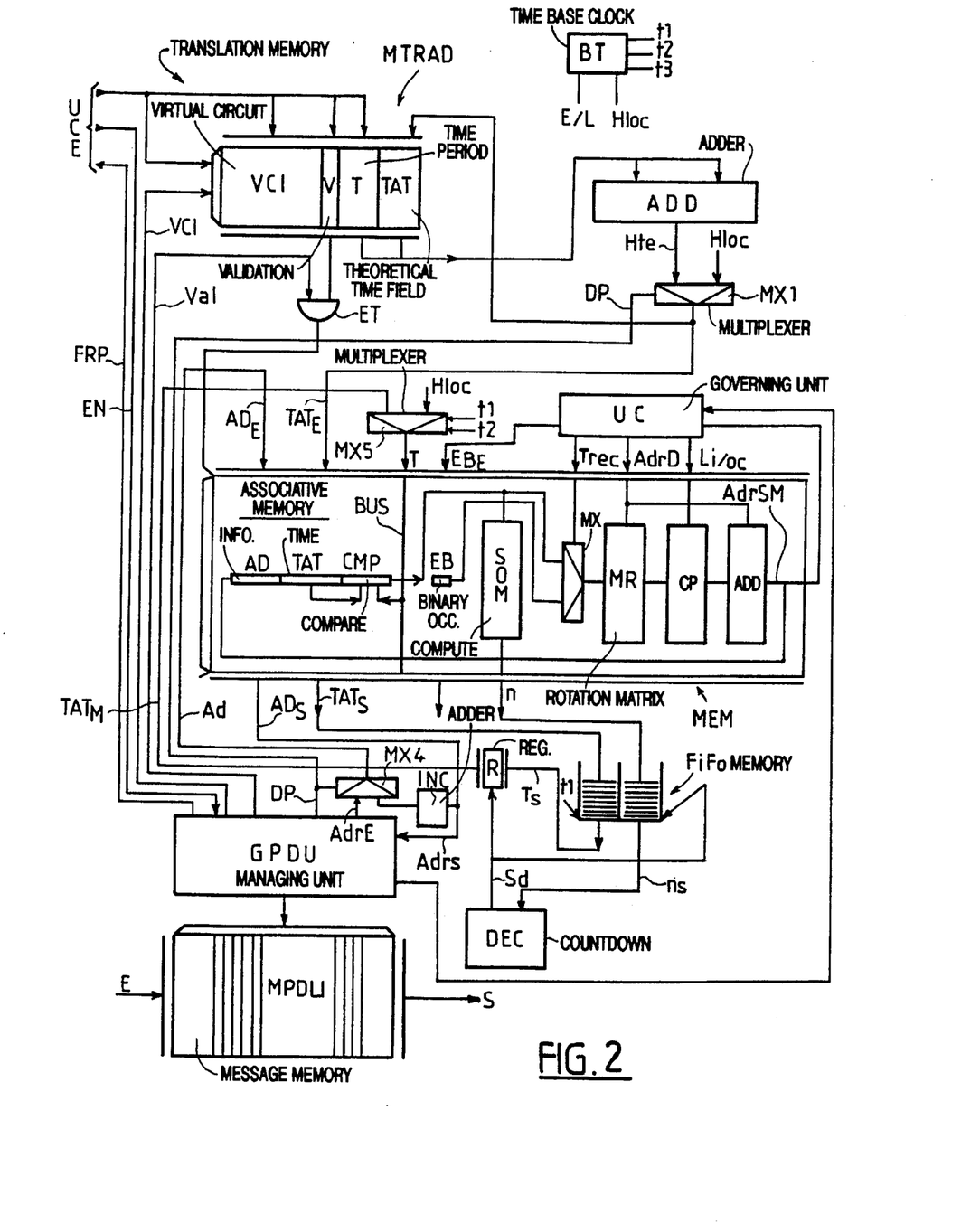
FIG. 2 is a synoptic diagram of a first mode of execution of a device provided so that it can carry out the process of the invention as indicated above.

There is shown a second mode of execution of a spacing device according to the invention, that takes up the same concept as the preceding mode of execution.

This spacing device comprises, as does the device of the first mode of execution, a memory MPDU, a managing unit GPDU, a memory MTRAD, an adder ADD, a multiplexing unit MX1, a multiplexing unit MX4 and a time base BT.

These elements fulfill the same function as in the device according to the first mode of execution. The time base BT delivers, besides the local clock-time signal Hloc, signals t1, t2, and t3 that are time sub-divisions of the time unit of the Hloc signal of the time base BT.

Figure 3:
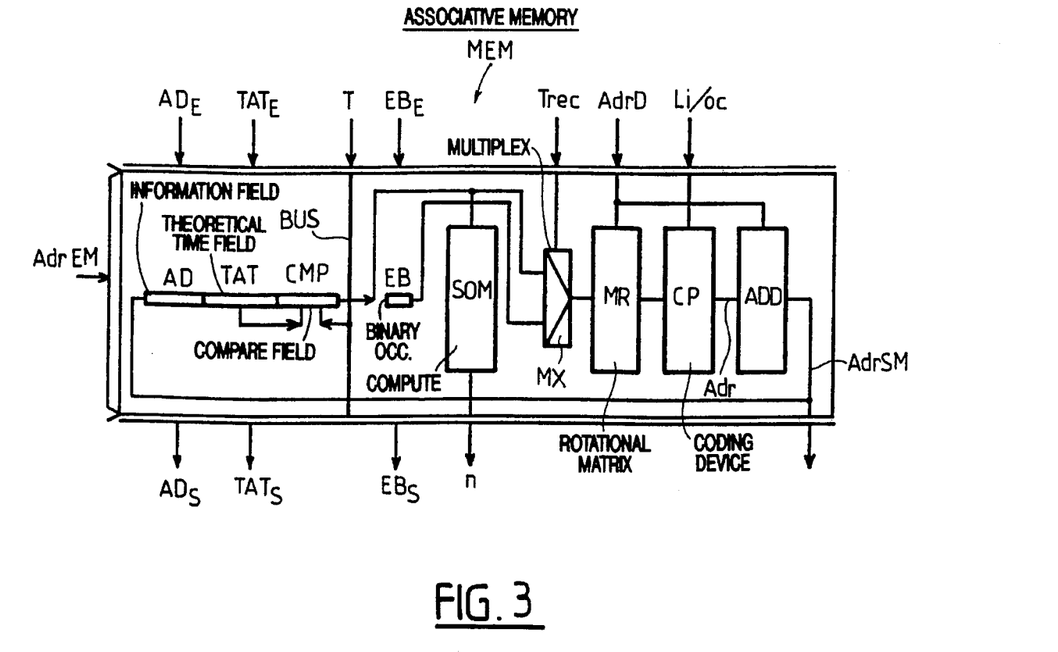
FIG. 3 is the synoptic diagram of an associative memory that is used in the device according to the second mode of execution of the invention.

The device in FIG. 2 comprises a memory MEM, called associative memory, a synoptic diagram of which is represented in FIG. 3.

The associative memory MEM shown in FIG. 3 comprises a certain number of memorization blocks each one of which is divided into at least four fields: a field meant to contain an information datum AD, a field meant to contain a value TAT that is associated with the information datum AD, a binary occupancy element EB representative of the state of occupancy of the block under consideration, and a binary comparison element CMP representative of the result of the comparison between the value TAT and the value T that is present on a bus BUS.

The values of the fields AD, TAT and EB can be written directly into a block by presenting, on the one part, the address AdrEM of this block to an input of the memory MEM and, on the other part, these values, respectively, on inputs ADE, $TAT_E$, and $EB_E$ of the memory MEM.

Besides, the values contained in the fields AD, TAT and EB may be read directly in a block by presenting the address AdrEM of this block to the input of the memory MEM and by reading these values on outputs $AD_S$, $TAT_S$ and $EB_S$ of the memory MEM.

It further comprises a rotation matrix MR that it self has a number of inputs equal to the number of outputs of a multiplexing unit MX that has two groups of inputs meant respectively to receive the binary elements CMP and EB values for all of the blocks in memory MEM. The multiplexing unit MX comprises a governing input that has a binary signal Trec. When the latter is in a first state, the values of all of the CMP elements meet at the output of the multiplexing unit MX and therefore on the inputs of the rotation matrix MR. On the other hand, when it is in a second state, it is the values of all of the EB elements that meet at the output of the multiplexing unit MX and therefore on the input of the rotation matrix MR.

The rotation matrix MR receives a signal carrying an address AdrD for the beginning of a search.

It comprises a number of outputs that is equal to the number of its inputs. The values assumed by the outputs of the matrix MR are those taken on its inputs, in the same order, but with an origin that is shifted by a number equal to AdrD. Thus, the first output copies the value of the input address AdrD, the second output copies the value of the input address AdrD+1, etc.

It further comprises a coding device CP the inputs of which respectively are connected to the outputs of the rotation matrix MR. The coding device CP also comprises a governing input that carries a binary element Li/Oc. The coding device CP computes the first address Adr, starting from its first input, of the input that receives a value equal to that of the binary element Li/Oc. This address Adr is delivered on an output of the coding device and it is supplied to a first input of an adder ADD the second input of which receives the governing signal AdrD. The output of the adder ADD supplies the address AdrSM.

It further comprises a circuit SOM the inputs of which respepctively receive the values of the fields CMP of all of the blocks of memory MEM, and that computes the number n of CMP elements representative of an equality between the TAT value of the content of the blocks and the T value present on the bus BUS. This number n is available on an output of the memory MEM.

The memory MEM according to the present invention functions in the following manner:

In a first mode, it manages the availability of external resources. To that end, the input Trec is positioned so that the entire group of values of the binary element EB will meet at the input of the rotation matrix MR. The address signal AdrD is equal to the value of the address starting from which the search for availability is started. The signal Li/Oc is equal to the binary value that is used by the element EB to mark a state of occupation of a block.

The address Adr delivered by the coding device CP then corresponds to the first address at the output of the rotation matrix MR for which the value EB is equal to the value Li/Oc. The address AdrS is the sum of address Adr and of the address AdrD. It is easy to understand that it corresponds to the first address of the block of memory MEM starting from the address AdrD, for which the value of EB is equal to the value of Li/Oc, that is to say for which the binary element EB marks a state of occupancy of the block.

In a second mode of operation, it is used as an associative memory in reading mode. To that end, there is first positioned a value T on the bus BUS, a value that corresponds to the value taken on by the field TAT of the blocks the addresses of which are searched for. The input Trec is positioned in a manner such that the entire group of values of the binary elements CMP meet at the input of the rotation matrix MR.

The address signal AdrD is equal to the value of the address from which the search is carried out. The signal Li/Oc is positioned at a value equal to the binary value that is used by the element CMP to mark an equal comparison.

The address Adr delivered by the coding device CP then corresponds to the first address at the output of the rotation matrix MR for which the CMP value is equal to the Li/Oc value. The address AdrS is the sum of address Adr and of address AdrD. It is easy to understand that it corresponds to the first address of the memory block, starting from address adrD, and for which the value of CMP is equal to the value Li/Oc, that is to say for the block of the memory MEM for which the value taken on by the field TAT is equal to the value T.

The memory MEM delivers, in this mode of operation, the number n of equal comparisons encountered.

In a third mode of operation, it is used as an associative memory with external addressing in writing mode. This mode of operation is identical to the second mode, but it is in writing mode instead of being in reading mode.

Indeed, there is first positioned a value T on the bus BUS, a value that corresponds to the value taken on by the fields TAT of the blocks the addresses of which are searched for. The input Trec is positioned in a manner such that the entire group of values of the binary elements CMP meet at the input of the rotation matrix MR.

The address signal AdrD is equal to the value of the address starting from which the search is carried out. The signal Li/Oc is positioned at a value equal to the binary value used by the CMP element to mark an equal comparison.

The address Adr delivered by the coding device CP then corresponds to the first address at the output of the rotation matrix MR for which the value of CMP is equal to the value of Li/Oc. The address AdrS is the sum of address Adr and of address AdrD. The address signal AdrSM is re-inserted, internally, onto the address input AdrEM of the memory MEM.

Each field AD, TAT, EB of a block thus addressed by AdrEM is loaded with values that are present on the corresponding inputs $AD_E$, $TAT_E$, and $EB_E$ of the memory MEM.

The memory MEM delivers, in this mode of functioning, the number n of equal comparisons encountered.

In a fourth mode of functioning, it is used as an associative memory with addressing in writing mode and with a search for the first block available. To that end, the input Trec is positioned in a manner such that the entire group of values of the binary elements EB will meet at the input of the rotation matrix MR.

The address signal AdrD is equal to the value of the address starting from which the search for availability is carried out. The signal Li/Oc is positioned at a value that is equal to the binary value used by the element EB to mark a state of non-occupancy.

The address Adr delivered by the coding device CP then corresponds to the first address at the output of the rotation matrix MR for which the value of EB is equal to the value of Li/OC. The address AdrS is the sum of address Adr and of address AdrD. It is easy to understand that it corresponds to the first address of the block of memory MEM, starting from address AdrD, that is not already occupied.

The address AdrSM is re-inserted to the addressing input of the memory MEM as an addressing signal AdrEM. The values on the inputs $AD_E$, $TAT_E$, and $EB_E$ are stored in the block the address of which is AdrEM=AdrSM.

The spacing device in FIG. 2 thus comprises an associative memory MEM such as the one just described with respect to FIG. 3. The input $AD_E$ of this memory is connected to the output of the multiplexing unit MX4 the inputs of which, it will be remembered, respectively receive the address signal AdrE delivered by the GPDU unit, and the signal AdrS+1 delivered at the output of an adder INC. The multiplexing unit MX4 is governed by the signal DP delivered by the managing unit GPDU. The output $AD_S$ of memory MEM carries the signal AdrS that is supplied to the input of the adder INC and to an input of the managing unit GPDU.

The input $TAT_E$ of memory MEM is connected to the output of the multiplexing unit MX1. Multiplexing unit MX1 is also governed by the signal DP delivered by the managing unit GPDU.

The spacing device shown in FIG. 3 further comprises a double Fifo file, of which a first input receives the signal n delivered by the circuit SOM of memory MEM and a second input receives the signal $TAT_S$ delivered by the memory MEM.

A first output of the Fifo file delivers a number n, to a counting-down unit DEC and its second output delivers a signal $T_S$ to a register R that is piloted in writing mode when a null counting-down signal sd is delivered by a suitable output of counting-down unit DEC. The null counting-down signal sd generated by the counting-down unit DEC also governs the Fifo file in reading mode so that the latter will deliver the values $n_S$ and $T_S$ to the counting-down unit DEC and to the register R, respectively. The counting-down unit DEC thus is initialized by the value $n_S$ and the register R is loaded with the value $T_S$.

The Fifo file is governed in the writing mode by the clock signal $t_1$ generated by the time base BT.

The entire group Fifo file, counting-down unit DEC, register R forms a memorization circuit.

The output of register R, that carries the signal given the reference $TAT_M$ is connected to a first input of a multiplexing unit MX5 a second input of which receives the local clock-time signal Hloc. The output of the multiplexing unit MX5 is governed by the clock signals $t_1$ and $t_2$ generated by the time base BT.

The spacing device according to this mode of execution further comprises a governing unit UC that is meant to position the memory MEM into one of its four modes of operation. To that end, it is connected to the inputs $EB_E$, Trec, AdeD and Li/Oc of the memory MEM. It also receives the signal AdrSM of the memory MEM as well as a governing signal generated by the managing unit GPDU.

The operation of the spacing device shown in FIG. 2 is as follows:

There will first be considered the initialization phase during which the managing unit GPDU initializes the spacing device for the sending of a given message.

When a message is to be sent from memory MPDU, the managing unit GPDU sends a reservation requesting signal FRP to the external unit UCE and the latter responds to it by transmitting on the one part a signal EN acknowledging the reservation of resources and, on the other part, the following data relating to this message to be sent: the VCI number ascribed to the message, the value of the period T that corresponds to the rate of flow of the cells forming the message, as well as the validation signal V that is positioned at a level equal to one. All of these data are simultaneously stored into the memory Mtrad at an address that corresponds to the VCI number of the message.

After having received the acknowledgement signal EN, the managing unit GPDU delivers to the input of multiplexing unit MX4 the address AdrE, in the memory MPDU, of the first cell of the message being processed. It also positions the governing bit DP in a manner such that the multiplexing unit MX1 delivers the signal Hloc to the input $TAT_E$ of memory MEM and to the input of memory MTRAD, and in a manner such that multiplexing unit MX4 delivers the address signal AdrE to the writing mode input $AD_E$ of memory MEM. It also controls the governing unit UC in a manner such that the memory MEM will operate according to its fourth mode. To that end, the input AdrD of memory MEM receives the signal $TAT_E$=Hloc, the input Trec is positioned so that it is the entire group of values from the binary elements EB that meets at the input of the rotation matrix MR, and signal Li/Oc is positioned at a value equal to the binary value that is used by the EB element to marka state of nonoccupancy.

The memory MEM determines, as seen above, the address of the first block of memory MEM, starting from the address AdrD, that is not already occupied. This address AdrSM is re-inserted internally to the addressing input AdrEM of memory MEM.

The value AdrE and the value Hloc then are memorized into memory MEM at the address of the first non-occupied block starting from the address corresponding to $ATA_E=$Hloc. At the same time, the bit EB is positioned by unit UC, at a value that marks a state of occupancy.

These operations take place during the initialization phase, when the signal DP is active.

The transmissions per se of the message cells are carried out according to cycles that are timed by the signals t1, t2 and t3 generated by the time base BT. For these cycles, the signal DP, reversed relative to the initialization phase, is positioned so that the multiplexing unit MX1 delivers the signal of theoretical clock-time Hte for the sending, to the input of memory MTRAD and to the input of the memory MEM, and in a manner such that the multiplexing unit MX4 delivers the address signal AdrS+1 generated by the adder INC.

During time t1 of the time base BT, multiplexing unit MX5 is piloted by the signal $t_1$ in a manner such that it is the local clock-time signal Hloc that is applied to the input T of memory MEM. The latter is governed by the unit UC so that it will function according to its second mode. Therefore it delivers the number n of equal comparisons encountered, that is to say the number of blocks for which the content of the TAT field is equal to the value present in the bus BUS, that is to say, taking into account the positioning of the multiplexing unit MX5, the local clock signal Hloc. It also delivers the signal $TAT_S$ that corresponds to the local clock-time Hloc. At that time $t_1$, the file Fifo is governed in writing mode so that the number n and the signal $TAT_S$ are memorized in the double Fifo file.

During time $t_2$ of the base time BT, the multiplexing unit MX5 is piloted by the signal $t_2$ so that it will be the signal $TAT_{M,\text{generated by the register } R}$, that is applied to the input T of the memory ME.

Memory MEM still functions according to its second mode. Therefore it delivers, at its output ADs, the address signal AdrS contained in the field AD of the first block, starting from address AdrD, for which the content of the TAT field is equal to the value TAT generated by register R. The signal of address AdrD corresponds, for example, to the last address of memory MEM that has been read+1. The address signal AdrS is supplied to the managing unit GPDU that governs, as already explained the sending of the cell stored in memory MPDU at address AdrS.

It will be noted that, during $t_2$, if the value of the counting-down unit DEC is null, the values $T_S$ and $n_S$ present at the output of the Fifo file are read in that file. The register R then is loaded with that value $T_S$, and the value $n_S$ also is loaded into counting-down unit DEC in order to initialize it.

If, on the other hand, the value of counting-down unit DEC is not null, however, the value of $TAT_M$ is kept in register R.

During time t2 the managing unit GPDU applies to memory MTRAD the VCI number of the virtual circuit to which belongs the cell that has just been sent. The memory MTRAD then delivers the signal T and the signal TAT stored in memory MTRAD at the address corresponding to the VCI number. These signals are supplied to the adder ADD that then computes the theoretical clock-time Hte for sending the next cell that is part of the same message. Taking into account the position of the multiplexing unit MX1, the clock-time signal Hte is found again at the intake TAT of memory MEM.

During time $t_3$, the memory MEM is governed by the unit UC in a manner such that it operates according to its fourth mode. It then determines, as seen above, the address of the first block of memory MEM, starting from address AdrD, that is not occupied yet. The address AdrD is, for example, equal to the value of the signal Hte indicating the theoretical clock-time of sending. The address AdrSM determined by the memory MEM is re-inserted to its addressing input AdrEM for the writing, at that address, of the values present at these inputs $AD_E$ and $TAT_E$, that is to say, respectively, the value AdrS+1 delivered by adder INC via multiplexing unit MX5, and the value of Hte delivered by adder ADD via multiplexing unit MX1.

The transmitting cycles continue until the last cell of the message has been sent. The managing unit then inhibits the process by positioning at zero the bit V of memory MTRAD. The gate ET also has its output positioned at zero, at that point, this inhibiting the functioning of memory MEM.

We claim:

1. A process to space over time, with a given period, the transmissions of cells pertaining to messages, said messages being stored in a message memory in a manner such that their cells will be stored at consecutive addresses of said message memory, a period being ascribed to each message, said process comprising the steps of:

(A) storing into a block of an address memory (APDU), during a phase of initialization of a message, a value of an address in a message memory (MPDU) of a first cell of said message in relation to an hour in which it is being sent (Hre), then:

(B) at each clock-time given by a local clock-time (Hloc),
(B1) reading the address value that is contained in the block of the address memory (ADPU) and its relation with said local clock-time (Hloc),
(B2) ordering the sending of the cell having the address read into said address memory (ADPU) into the message memory (MPDU),
(B3) computing, by addition, on one part a period ascribed to the message of which said cell sent in step (B2) is a part and, on another part, a time for sending a next cell of said message,
(B4) determining an address of the next cell of said message by incrementing the address of said cell sent in step (B2), and
(B5) storing an address value of the next cell thus determined into a block of the address memory in relation to the clock-time of its transmission computed in step (B3).

2. A process according to claim 1, comprising a further step wherein the relating of an address value to the clock-time value of step (B) is done by addressing a block of the address memory (ADPU) with a signal that is representative of said clock-time, the content of said block being said address value (ADPU).

3. A process according to claim 1, comprising a further step wherein the relating of an address value to the clock-time is done by storing said value and said clock-time into two fields of a same block of said address memory.

4. A process according to one of the preceding claims, comprising a further step wherein the step (A) storing into said address memory is performed in a block the address of which is the first non-occupied address starting from the address that corresponds to a transmission clock-time of a cell which is stored in the message memory (MPDU).

5. A device to space transmissions over time, with a given period, of cells that belong to messages, said messages being stored in a message memory (MPDU) so that said cells are stored at consecutive addresses of said message memory (MPDU), a period (T) being ascribed to each message, a device for the execution of the process according to claim 1, said device comprising:

an address memory (APDU) having blocks in which are stored, at addresses that respectively correspond to the transmitting clock-times (Hre) of the corresponding cells, the values of the addresses, in said message memory, of the cells which are to be transmitted, a time base means (BT) for providing an address to said address memory, while in the reading mode, said address being an address signal Hloc that corresponds to a local clock-time, said address memory (APDU) then delivering the value of an address (AdrS) of the message memory (MPDU), a managing unit (GPDU) for receiving said read address value (AdrS) and simultaneously ordering a sending of the cell stored at said address (AdrS) of the message memory (MPDU), a translation memory (MTRAD) in each block in which there are stored, on one part the period (T) ascribed to a given virtual circuit number (VCI) and, on an other part, the clock-time of transmission (TAT) of the next cell to be sent, said next cell being from the message carried by said virtual circuit (VCI), the address of each block, corresponding to the number of said virtual circuit (VCI), said managing unit (GPDU) addressing said translation memory (MTRAD) in a reading mode with the number of the virtual circuit (VCI) to which the cell that has just been transmitted belongs, and said translation memory (MTRAD) delivering said period (T) and said corresponding transmitting clock-time (TAT), an adder (ADD) for adding said period (T) and said transmitting clock-time (TAT) delivered by the translation memory (MTRAD), said adder computing the transmitting clock-time (Hte) for the transmission of the next cell, the managing unit (GPDU) determining the address value (AdrS+1) of the next cell to be sent, said adder (ADD) addressing said address memory (APDU) while in a writing mode with said sending clock-time (Hte) computed for writing an address value (AdrS +1) into said address memory thus determined.

6. A device according to claim 5, further comprising means (MAD) for writing, said address value of said next cell into a block of the address memory (APDU), at the first nonoccupied address after the address that corresponds to the sending time determined by said adder (ADD).

7. A device to space transmission over time, with a given period, of cells that belong to messages, said messages being stored in a message memory (MPDU), the cells being stored at consecutive addresses of said message memory (MPDU), a period (T) being ascribed to each message, said device executing the process according to claim 1 and comprising:

an address memory (MEM) of an associative memory type that comprises a plurality of memorization blocks, each of said blocks being divided into a first field containing a value (AD) of an address in said message memory (MPDU) for a cell of a message to be transmitted, and into a second field containing a time for sending a clock-time (TAT) of the next cell of said message to be transmitted, into a third field containing a binary occupancy element (EB) and into a fourth field containing a comparison binary element (CMP), the comparison binary element having a state which is representative of a comparison between the value (TAT) contained in the second field and a value that is present on a search input (T) of said address memory, a time base means (BT) for delivering a signal (Hloc) of local clock-time to said search input (T) of said address memory (MEM), said address memory (MEM) positioned in the reading mode, delivering an address value (AdrS) contained in a field of a block of the address which is the first address starting from a pre-determined address, and which the comparison binary element (CMP) makes an equal comparison between said local clock-time signal (Hloc) present on its search input (T) and the content (TAT) of its second field, a management unit (GPDSU) provided to receive a previously delivered read address value (AdrS) and simultaneously to order the sending of the cell stored at said previously delivered address of the message memory (MPDU), a translation memory (MTRAD) in each block of which there are stored, on one part the period (T) ascribed to a number of a given virtual circuit (VCI) and, on another part, a clock-time (TAT) for transmitting the next cell to be sent in the message carried by said virtual circuit (VCI), the address of each block corresponding to the number of said virtual circuit (VCI), said managing unit (GPDU) addressing said translation memory (MTRAD) in a reading mode with the number of the virtual circuit (VCI) containing the cell that has just been transmitted and said translation memory (MTRAD) delivering said period (T) and said corresponding sending clock-time (TAT), an adder (ADD) for adding said period (T) and said sending clock time (TAT), said adder computing said sending clock-time (Hte) of the next cell and delivering said sending clock-time to said address memory (MEM) for writing into the second field of a block, the managing unit (GPDU) determining the address value (AdrS+1) of the next cell to be sent and delivering it to said address memory (MEM) in the first field of said block, said block being the block the address of which is the first one starting from a predetermined address and in which the binary occupation element (EB) presents a state marking availability.

8. A device according to claim 7, further comprising a summation circuit (SOM) for delivering a signal representative of a number of comparison binary elements (CMP) marking a comparison equality between the content (TAT) of the second field of the blocks of said memory (MEM) and a value present on the search input (T) of said memory (MEM), a file (Fifo) of a first in—first out type, in which there are stored, during a first time ($t_1$) for governing the reading of said memory (MEM), on one part, a sending clock-time ($TAT_S$) delivered by said memory (MEM) and, on another part, a number ($n_S$) delivered by said summation circuit (SUM), the local clock-time signal (Hloc) being present at the search input (T) of said memory (MEM) during said first time ($t_1$), a register (R) loaded with the value delivered by said file (Fifo) when in a reading mode and a counting-down device (DEC) that is initialized with the value ($n_S$) of the number delivered by file (Fifo) when in a reading mode, said register (R) being decremented by one unit at each reading of the register (R), the file (Fifo) being in the reading mode when the counting-down unit (DEC) reaches a counting null, the register (R) being read to deliver a clock-time signal ($TAT_M$) to the search input (T) of said memory (MEM) during a second time ($t_2$) of the order for the reading mode of said memory (MEM).

* * * * *